US008270370B2

(12) United States Patent
Asanuma et al.

(10) Patent No.: US 8,270,370 B2
(45) Date of Patent: Sep. 18, 2012

(54) BASE STATION CONTROLLER AND METHOD FOR RESTRICTING ACCESS

(75) Inventors: Michihiro Asanuma, Chigasaki (JP); Jumpei Watanabe, Yokohama (JP); Akio Kawase, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 714 days.

(21) Appl. No.: 12/419,556

(22) Filed: Apr. 7, 2009

(65) Prior Publication Data
US 2009/0253430 A1 Oct. 8, 2009

(30) Foreign Application Priority Data

Apr. 7, 2008 (JP) ................................. 2008-098864

(51) Int. Cl.
*H04W 4/00* (2009.01)
(52) U.S. Cl. ........................................................ 370/331
(58) Field of Classification Search .................. 370/203, 370/204–215, 229–253, 310–350, 395.1, 370/395.3, 395.4, 395.41, 395.42, 395.5, 370/395.52, 395.53, 412–421, 431–529
See application file for complete search history.

(56) References Cited

U.S. PATENT DOCUMENTS

| | | | | |
|---|---|---|---|---|
| 6,091,955 A * | 7/2000 | Aalto et al. | ..................... | 455/447 |
| 7,065,362 B2 * | 6/2006 | Lee et al. | ..................... | 455/442 |
| 7,139,575 B1 * | 11/2006 | Chen et al. | ..................... | 455/437 |
| 7,269,423 B2 * | 9/2007 | Lee et al. | ..................... | 455/452.1 |
| 7,313,110 B2 * | 12/2007 | Guey et al. | ..................... | 370/329 |
| 7,376,424 B2 * | 5/2008 | Kim et al. | ..................... | 455/436 |
| 7,394,789 B2 * | 7/2008 | Sakawa et al. | ................ | 370/331 |
| 7,469,146 B2 * | 12/2008 | Soong et al. | ................... | 455/453 |
| 7,613,461 B2 * | 11/2009 | Inoko | ............................. | 455/450 |
| 7,643,441 B2 * | 1/2010 | de La Chapelle et al. | ..... | 370/316 |
| 7,672,276 B2 * | 3/2010 | Ode et al. | ....................... | 370/332 |
| 7,697,469 B2 * | 4/2010 | Wu et al. | ......................... | 370/328 |
| 7,756,198 B2 * | 7/2010 | Chen et al. | ..................... | 375/225 |
| 7,778,634 B2 * | 8/2010 | Sakawa | .......................... | 455/423 |
| 7,817,999 B2 * | 10/2010 | Tang et al. | .................. | 455/432.1 |
| 7,912,474 B2 * | 3/2011 | Hamabe et al. | ............ | 455/452.2 |

(Continued)

FOREIGN PATENT DOCUMENTS

CN 1366432 8/2002

(Continued)

OTHER PUBLICATIONS

"cdma2000 High Rate Packet Data Air Interface Specification", 3GPP2 Specification C.S. 0024-B v2.0 6.4 Default Session Configuration Protocol, 7.2 Default Air-Link Management Protocol, and 9.4 Default Access Channel MAC Protocol.

*Primary Examiner* — Kwang B Yao
*Assistant Examiner* — Jung-Jen Liu
(74) *Attorney, Agent, or Firm* — Antonelli, Terry, Stout & Kraus, LLP.

(57) ABSTRACT

In a base station controller for controlling the operation of a base station for executing call control which permits a connection in response to a connecting request from a radio terminal, when a stop instruction of the call control of the base station is received, the number of radio terminals which can be connected to the base station is decreased and thereafter the call control is stopped, and when the call control of the base station is restarted, the number of radio terminals which can be connected to the base station is increased.

15 Claims, 13 Drawing Sheets

U.S. PATENT DOCUMENTS

| | | | |
|---|---|---|---|
| 2001/0034243 A1* | 10/2001 | Masuda et al. | 455/553 |
| 2002/0110090 A1 | 8/2002 | Iwamura et al. | |
| 2004/0228349 A1* | 11/2004 | Vrzic et al. | 370/395.4 |
| 2005/0020273 A1* | 1/2005 | Fong et al. | 455/453 |
| 2005/0176440 A1* | 8/2005 | Sang et al. | 455/453 |
| 2005/0221828 A1* | 10/2005 | Wakuta et al. | 455/437 |
| 2006/0029021 A1* | 2/2006 | Sakawa et al. | 370/331 |
| 2009/0047961 A1* | 2/2009 | Kim | 455/436 |
| 2009/0163223 A1* | 6/2009 | Casey | 455/453 |

FOREIGN PATENT DOCUMENTS

| | | |
|---|---|---|
| CN | 1859744 | 11/2006 |
| CN | 101052232 | 10/2007 |
| JP | 10-145864 | 5/1998 |

* cited by examiner

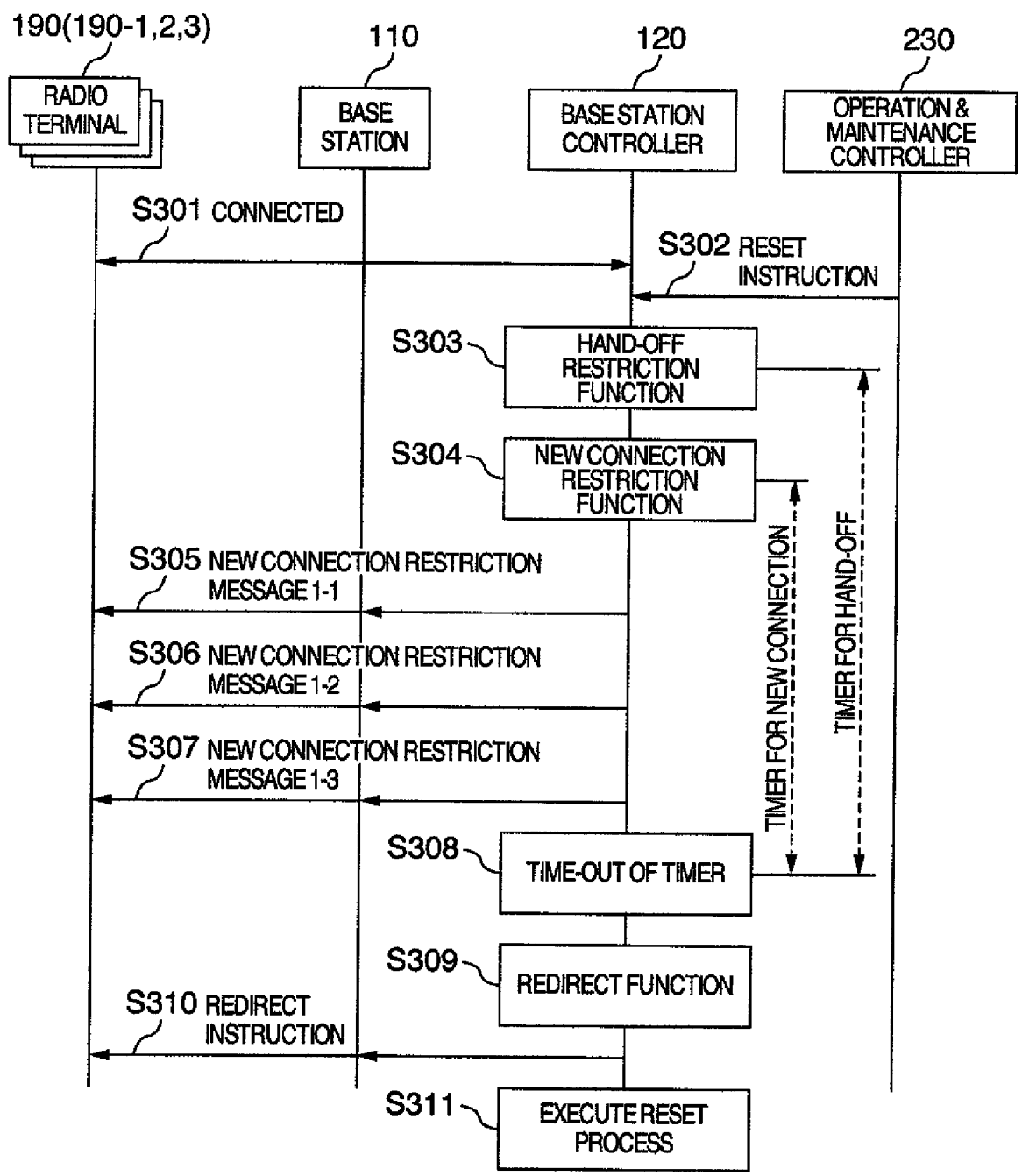

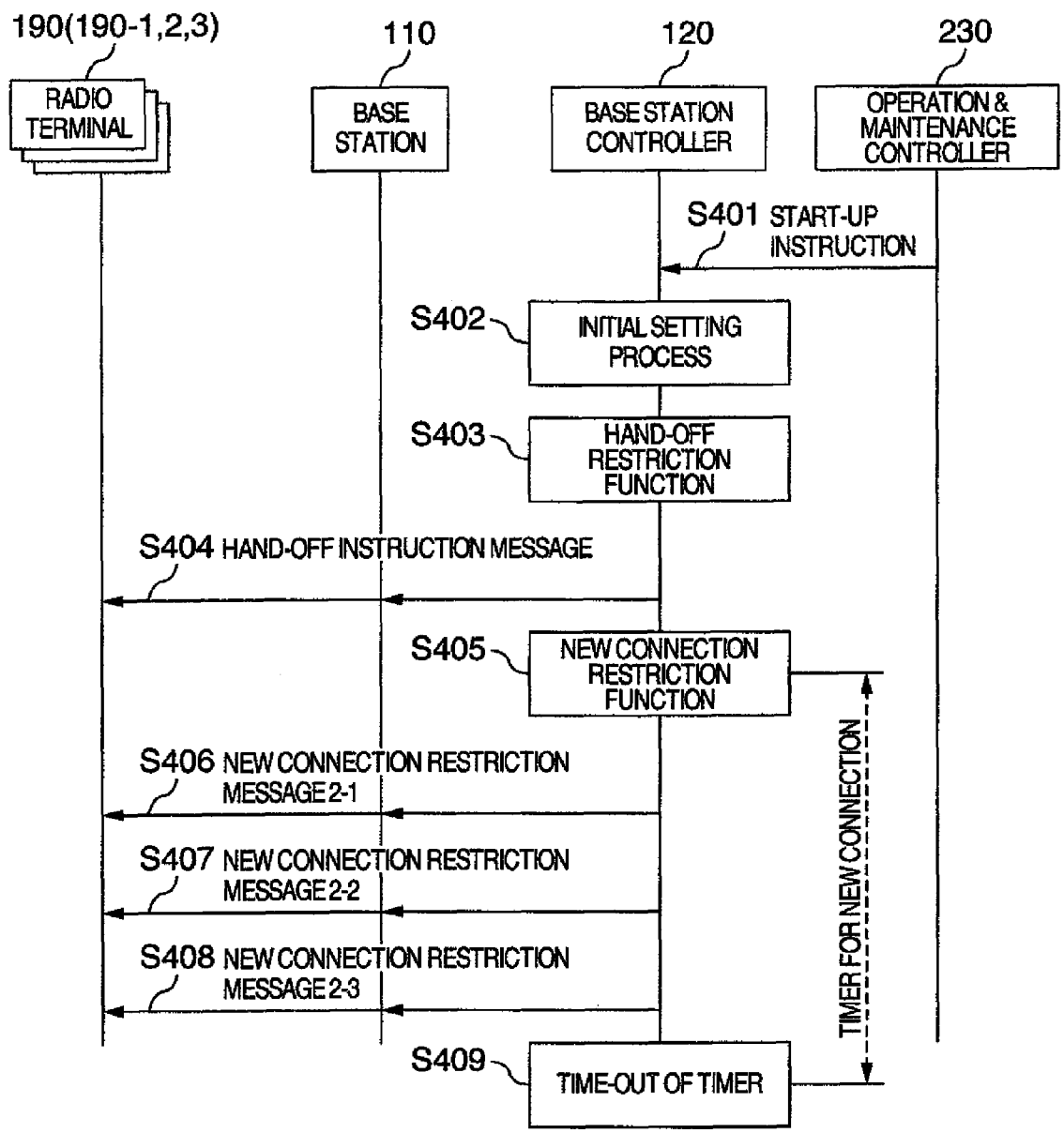

BASE STATION CONTROLLER AND METHOD FOR RESTRICTING ACCESS

INCORPORATION BY REFERENCE

The present application claims priority from Japanese application JP2008-098864 filed on Apr. 7, 2008, the content of which is hereby incorporated by reference into this application.

BACKGROUND OF THE INVENTION

The invention relates to a radio communication technique and, more particularly, to a technique for relieving access concentration on a radio base station (hereinafter referred as to a base station) from radio terminals.

In addition to a prior wired communication network, introduction of a radio communication network using radio terminals and a radio communication apparatus (hereinbelow, such a network is called a radio communication system) has been progressed. CdmaOne as a communication scheme using a CDMA technique, CDMA2000 and CDMA2000 1xEV-DO as upper standards thereof, and the like have been proposed.

In the radio communication system, the realization of a large capacity of communication data and a high communication speed is demanded for distribution of music, motion images or the like. In association with it, it is required that the base station has an advanced function and can cope with new functions. A frequency of software updating that cannot help temporarily stopping a call control service to the radio terminals is increasing.

In the radio communication system, the base station communicates with the radio terminals in an area called a cell where the base station can communicate. The base station has: a function for transmitting a message to force a radio terminal to reconnect to another cell by a broadcast to the radio terminals which are communicating in the cell (hereinafter referred as to a redirect function); and a function for broadcasting a message to control access frequency at which the radio terminals in its own cell make a new connection to the base station (hereinafter referred as to a new connection restriction function). The base station controls access from the radio terminals by using those functions.

SUMMARY OF THE INVENTION

Like software updating mentioned above, there is a case where the call control service of the base station in operation cannot help being temporarily stopped for maintenance. In such a case, if the call control service of the base station is stopped while the base station and the radio terminal are communicating, the radio terminal detects that the radio connection has been disconnected, and the communication is terminated.

After completion of the maintenance, if the base station restarts the call control service, the radio terminal detects a recovery of the radio connection to the base station which has been disconnected and requests the base station to make a call connection in order to reconnect. There is also a possibility that the radio terminal which was not communicating when the call control service was stopped also requests the base station to make a call connection in association with the restart of the call control service. The base station requested to make the call connection allocates identity information to the radio terminal. The radio terminal registers its location by using the identity information of the radio terminal allocated from the base station, negotiates communication protocols which are used between the radio terminal and the base station, and reconnects to the base station. (Refer to 3GPP2 Specification C.S. 0024-B v2.0 6.4 Default Session Configuration Protocol, 7.2 Default Air-Link Management Protocol, and 9.4 Default Access Channel MAC Protocol.)

When the base station restarts the call control service as mentioned above, a situation where a number of radio terminals which exist in the cell of the base station request the call connections in a lump is presumed. Consequently, since a large quantity of call connections from the radio terminals to the base station occur temporarily, a probability of lost calls rises. In addition, since any radio terminals can move the calls into the base station (hereinafter referred as to a hand-off), a load of call processing further occurs to the base station and a CPU overloading or a radio resource congestion is liable to occur in the base station.

Although a technique for locally restricting or inhibiting operations of call processing or the like of a mobile communication terminal apparatus has been disclosed in JP-A-10-145864, it cannot solve a problem peculiar to the time of the start, stop, and restart of the service of the base station as in the invention.

To solve the above problems, it is an object of the invention to relieve access concentration on a base station from radio terminals by automatically controlling the restriction of access from the radio terminals with respect to a stop or a restart of communication between the base station and the radio terminal.

To accomplish the above object, in a base station controller for controlling the operation of a base station for executing call control which executes connection setup in response to a connecting request from a radio terminal, when a stop instruction of the call control of the base station (110) is received, the number of radio terminals (190) which can be connected to the base station (110) is decreased and thereafter the call control is stopped, and when the call control of the base station (110) is restarted, the number of radio terminals (190) which can be connected to the base station (110) is increased.

When the call control function of the base station is restarted, the access concentration from the radio terminals can be avoided. A lack of resources and deterioration in radio quality in the radio communication system can be prevented.

Other objects, features and advantages of the invention will become apparent from the following description of the embodiments of the invention taken in conjunction with the accompanying drawings.

BRIEF DESCRIPTION OF THE DRAWINGS

FIG. 3 is a sequence diagram when the base station controller is reset (when a call control function is stopped);

FIG. 4 is a sequence diagram when the base station controller is started up (when the call control function is restarted);

DETAILED DESCRIPTION OF THE EMBODIMENTS

An example of a preferred embodiment of the invention will be described in detail hereinbelow. However, the invention is not limited to the embodiment.

Figure 1:
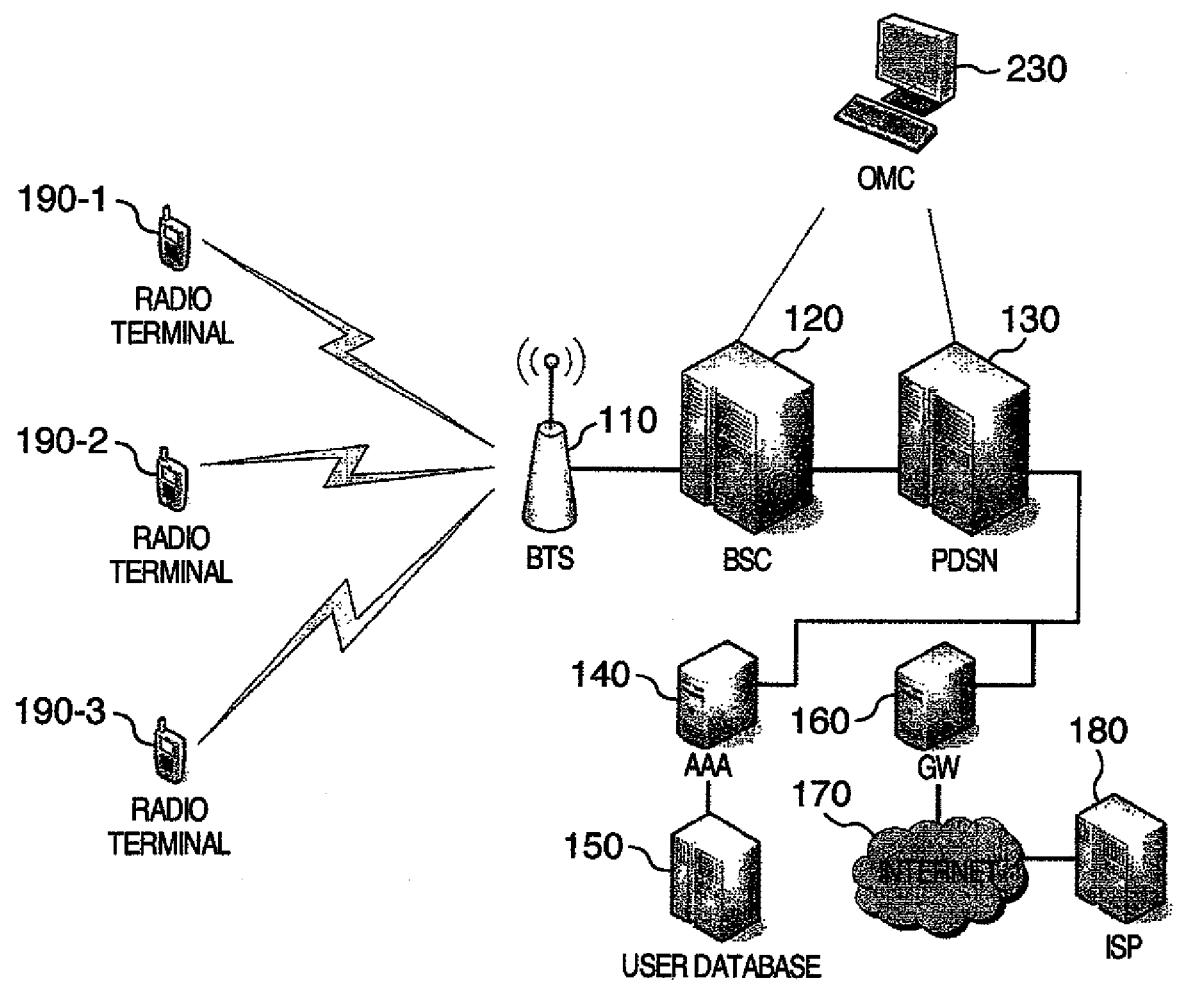
FIG. 1 is a network construction of a radio communication system.

FIG. 1 shows a construction of a radio communication system. The radio communication system comprises: a radio terminal 190 (three radio terminals 190-1, 190-2, and 190-3 are shown in FIG. 1); a base station 110 (BTS: Base Transmitter Station) for communicating with the radio terminals 190; a Base Station Controller 120 (BSC) for managing and controlling the operation of the base station 110; a packet data serving node 130 (PDSN) for relaying a packet for connecting to an Internet 170; a user authenticating server 140 (AAA: Authentication Authorization and Accounting); a user database 150 for storing various kinds of data of users; a gateway 160 (GW) for relaying a packet for connecting to an Internet provider 180 (ISP: Internet Services Provider) through the Internet 170; and the operation & maintenance controller 230 (OMC) which can generate instructions to the base station 110 and the base station controller 120 at the time of the operation and maintenance. Although the base station can communicate with as many as possible of radio terminals, a case where three radio terminals exist is illustrated in FIG. 1.

By operating the radio terminal 190, a user can transmit and receive (communicate) packet data or the like to/from (with) the user authenticating server 140 and the Internet provider 180 via the base station 110, base station controller 120, and PDSN 130. The foregoing radio communication system is also applicable to the radio technique of any one of TDMA, CDMA, FDMA, and the like.

It is an object of the embodiment to relieve access concentration that occurs when communication between the radio terminal and the base station is restarted after the communication was temporarily stopped, by using a redirect function, a new connection restriction function, and a hand-off restriction function of the base station controller 120 as necessary. A construction of the base station controller 120 and a flow for the operation thereof will be described hereinbelow.

Figure 2A:
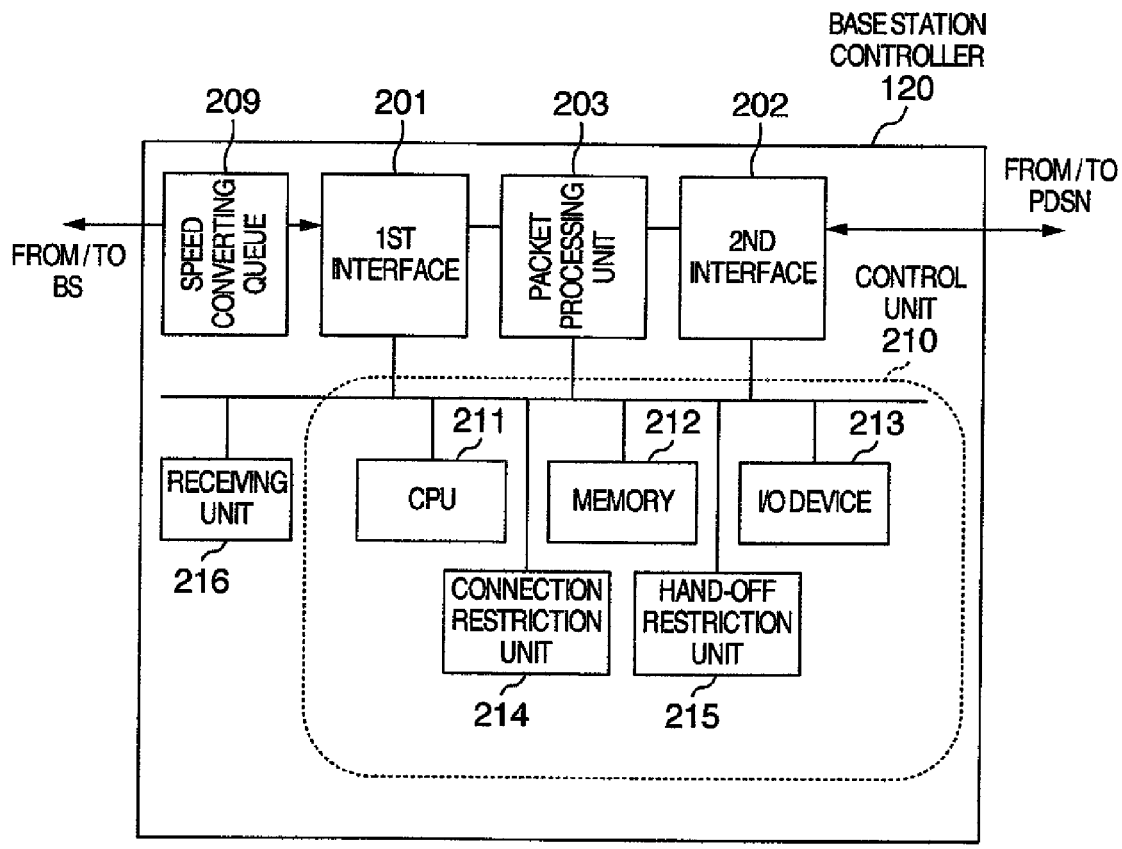
FIG. 2A is a hardware construction of a base station controller.
Figure 2B:
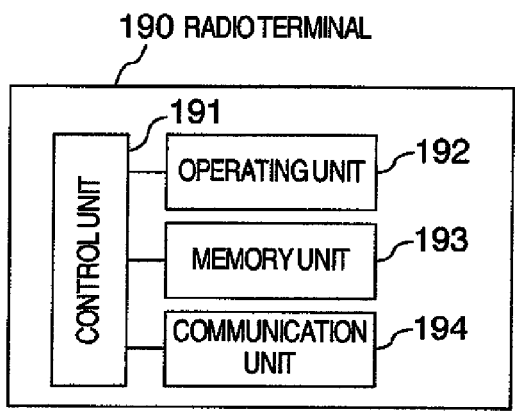
FIG. 2B is a hardware construction of a radio terminal.
Figure 2C:
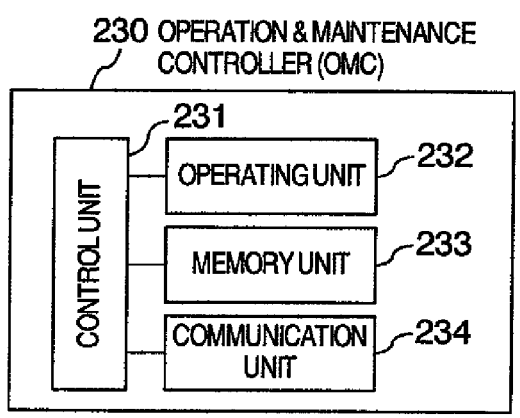
FIG. 2C is a hardware construction of an operation & maintenance controller.

FIGS. 2A, 2B, and 2C are block diagrams showing examples of constructions of the base station controller 120, the radio terminal 190, and the operation & maintenance controller 230, respectively. Specifically speaking, the base station controller 120 comprises: a first interface 201 which is used for connecting to the base station 110; a second interface 202 which is used for connecting to the packet data serving node 130 and the gateway 160; a packet processing unit 203 for executing a switching process and the like to signals transmitted and received between those interfaces; and a control unit 210 for controlling the whole base station controller 120. The control unit 210 includes: a CPU 211 as a processor for controlling the operation of the whole base station controller 120; a memory 212 for storing operating programs and various kinds of data necessary for the operation; an I/O device 213 for transmitting and receiving signals to/from external apparatuses; a connection restriction unit 214 for controlling the setting of the number of radio terminals which can be connected to the base station 110; and a hand-off restriction unit 215 for controlling the setting of a hand-off success ratio of the radio terminal which performs the hand-off to the base station 110.

When the packet is transmitted and received between the base station 110 and the base station controller 120, since there is a speed difference (between FastEther and SPAN T1 line), a speed converting queue 209 is used to transmit and receive data while buffering it. The radio terminal 190 includes: a control unit 191 for controlling the whole radio terminal; an operating unit 192 for displaying various kinds of menus and accepting the operation of the user or an key input pushed by the finger of the user; a memory unit 193 for storing various kinds of information; and a communication unit 194 (having a transmitting/receiving function of the data and a voice communication function) for communicating with the base station and another radio terminal. The operation & maintenance controller 230 includes: a control unit 231 for controlling the whole operation & maintenance controller; an operating unit 232 for displaying an operation guide to a maintenance person and accepting an instruction input from the maintenance person; a memory unit 233 for storing various kinds of information; and a communication unit 234 for communicating with the base station and the base station controller.

Figure 12:
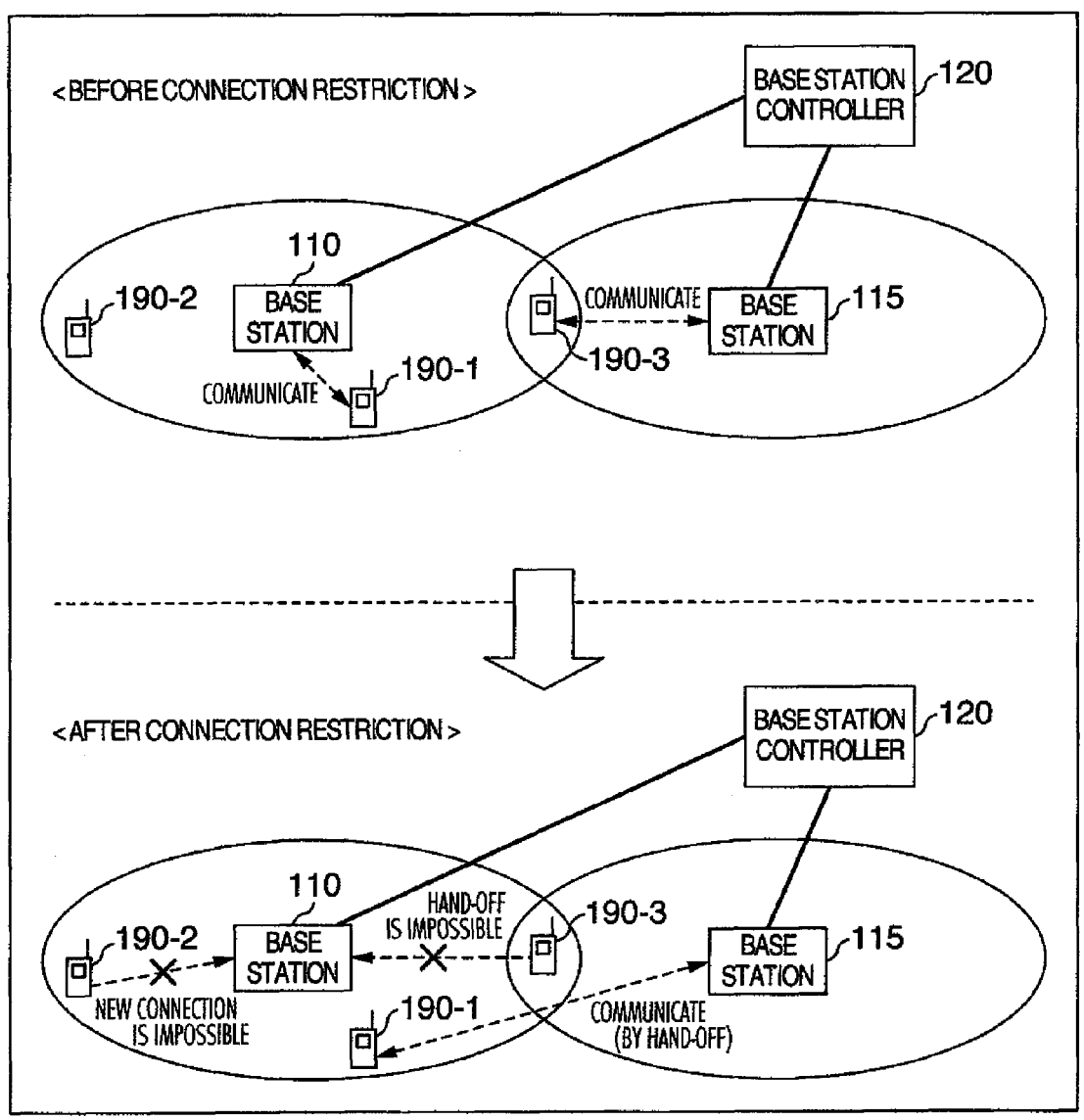
FIG. 12 is a conceptual diagram when the base station controller is reset (when the call control function is stopped)

FIG. 3 is a sequence when the base station controller 120 is reset (when a call control function is stopped). The figure shows the foregoing radio terminals 190-1, 190-2, and 190-3, base station 110, base station controller 120, and operation & maintenance controller 230. Further, their conceptual diagram is shown in FIG. 12. The radio terminals 190-1 and 190-2 exist in the cell of the base station 110. The radio terminal 190-3 exists at a location where the cell of the base station 110 and a cell of a base station 115 overlap. Before executing connection restriction, the radio terminal 190-1 among the three radio terminals is communicating with the base station 110, the radio terminal 190-2 is not communicating, and the radio terminal 190-3 is communicating with the base station 115.

First, an explanation is started from a situation where the radio terminal 190-1 and the base station controller 120 are connected and are communicating therebetween (step 301). The maintenance person operates the operation & maintenance controller 230 and makes a reset instruction to the base station controller 120 (step 302). The base station controller 120 which received the reset instruction makes the hand-off restriction operative and activates a timer for the hand-off (step 303). The controller 120 also makes the new connection restriction function operative and activates a timer for the new connection (step 304).

The restriction of the hand-off is realized by returning a hand-off acceptance response at a probability shown by a hand-off permission value in response to a message for requesting the hand-off. That is, if the whole hand-off is permitted (the hand-off permission value is set to 100%), when there are ten hand-off request messages from the radio terminals, it is sufficient to return a hand-off acceptance message response to all of those ten messages. Similarly, if half of all requested hand-off is permitted (the hand-off permission value is set to 50%), when there are ten hand-off request messages from the radio terminals, it is sufficient to return the hand-off acceptance message response to five messages among them. If the whole hand-off is not permitted (the hand-off permission value is set to 0%), when there are ten hand-off request messages from the radio terminals 190, the hand-off acceptance message response is not returned to all of those ten messages.

For example, assuming that the hand-off permission value is set to 0% (after connection restriction), as shown in FIG. 12, even if the radio terminal 190-3 existing at the location where the cell of the base station 110 and the cell of the base station 115 overlap intends to perform the hand-off to the base station 110, the hand-off is refused.

The new connection restriction function is a function for controlling the access frequency at which the radio terminal performs the new connection to the base station. When this function is made operative, the base station to which the radio terminal newly requested the connection can permit the connection during a period of time designated by the timer for the new connection (hereinafter, such a value is referred to as a new connection permission value), the base station controller broadcasts a message to radio terminals a "new connection restriction message" (message for controlling the access frequency at which the radio terminal performs the new connection to the base station) including the new connection permission value, by gradually decreasing a new connection permission value from a set value in operation to 0% during the period of time specified by the timer mentioned above. On the basis of the received new connection permission value, the radio terminal in the cell decides the access frequency at which the radio terminal requests the new connection to the base station. For example, the radio terminal which recognized a fact that the new connection permission value decreases from 80% to 40% decreases the access frequency at which the radio terminal requests the new connection to the base station. Thus, the number of radio terminals which request the new connection decreases when seen from the base station side.

After step 304, the base station controller 120 broadcasts three times the "new connection restriction message" including the new connection permission value to the radio terminals 190-1, 190-2, and 190-3 existing in the cell. It is assumed that before such a message is transmitted, the new connection permission value has been set to 100%. The first "new connection restriction message" 1-1 includes an instruction to set the new connection permission value to 60%. The second "new connection restriction message" 1-2 includes an instruction to set the new connection permission value to 20%. The third "new connection restriction message" 1-3 includes an instruction to set the new connection permission value to 0%. Although the "new connection restriction message" is transmitted three times here, the number of times of the transmission is not limited to three but may be set to an arbitrary number. It can be also arbitrarily set how much percent to decrease the new connection permission value each transmission of the "new connection restriction messages".

The control unit 210 in the base station controller 120 sets the new connection permission value stored in the memory 212 to 60% and transmits the "new connection restriction message" 1-1 including such a value to the radio terminals 190-1, 190-2, and 190-3 (step 305). The radio terminals 190-1, 190-2, and 190-3 which received the "new connection restriction message" 1-1 decrease the access frequency at which the radio terminal requests the new connection to the base station 110 to 60%. The "new connection restriction message" is broadcasted to all radio terminals in the cell irrespective of whether or not the radio terminal is communicating.

Subsequently, the control unit 210 in the base station controller 120 sets the new connection permission value stored in the memory 212 to 20% and transmits the "new connection restriction message" 1-2 including such a value to the radio terminals 190-1, 190-2, and 190-3 (step 306). The radio terminals 190-1, 190-2, and 190-3 which received the "new connection restriction message" 1-2 decrease the access frequency at which the radio terminal requests the new connection to the base station 110 to 20%. Subsequently, the control unit 210 in the base station controller 120 sets the new connection permission value stored in the memory 212 to 0% and transmits the "new connection restriction message" 1-3 including such a value to the radio terminals 190-1, 190-2, and 190-3 (step 307). The radio terminals 190-1, 190-2, and 190-3 which received the "new connection restriction message" 1-3 decrease the access frequency at which the radio terminal requests the new connection to the base station 110 to 0%.

When the new connection permission value is set to 0% (after connection restriction), the radio terminal 190-2 existing in the cell of the base station 110 as shown in FIG. 12 cannot generate a message for requesting a call connection, so that the call connection does not occur. This is because the terminal uses the new connection permission value as an occurrence probability of a new call connection. In parallel with steps 305 to 307, the hand-off permission value is gradually decreased by using the hand-off restriction function and the hand-off permission value stored in the memory 212 is set to 0.

When the periods set in the timer for the new connection and the timer for the hand-off expires (step 308), the base station controller 120 makes the redirect function operative and transmits a redirect instruction to the radio terminal 190-1 which is communicating (steps 309 and 310). The redirect function here is a function for issuing an instruction to the radio terminal 190 which exists in its own cell and is communicating so as not to be connected to its own cell. The radio terminal 190-1 which received the redirect instruction disconnects the connection to the base station 110 which is communicating with itself, makes a call connection to the base station 115 in another cell seen around the radio terminal 190-1, and continues the communication (refer to FIG. 12). Subsequently, the base station controller 120 executes a resetting process and completely stops the call process (step 311).

Figure 13:
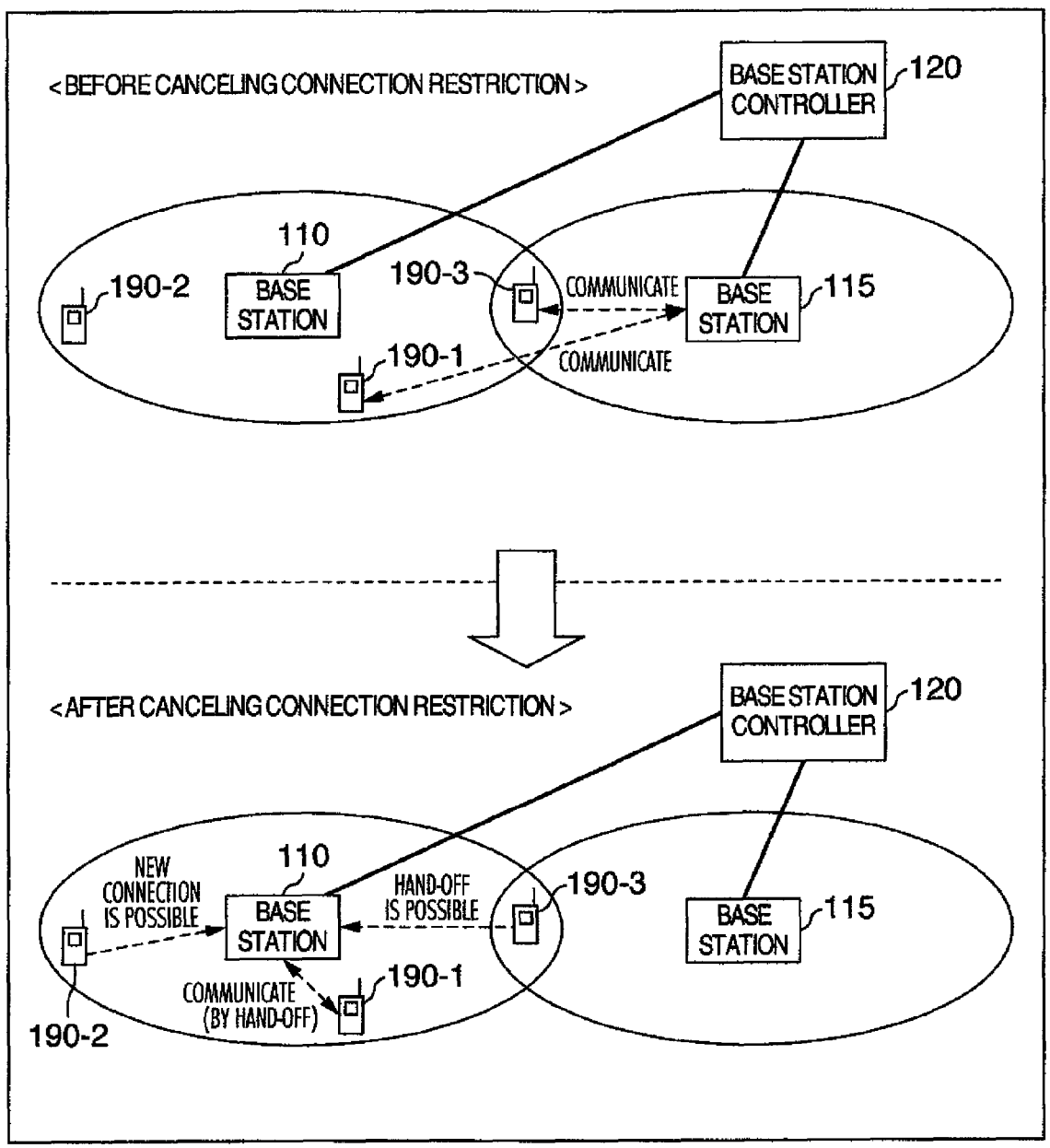
FIG. 13 is a conceptual diagram when the base station controller is started up (when the call control function is restarted).

FIG. 4 is a sequence diagram when the base station controller 120 is started up (when the call control function is restarted). A conceptual diagram of a system in which the radio terminals 190-1, 190-2, and 190-3, base station 110, and base station controller 120 exist is shown in FIG. 13. The radio terminals 190-1 and 190-2 exist in the cell of the base station 110. The radio terminal 190-3 exists at the location where the cell of the base station 110 and the cell of a base station 115 overlap. Before canceling a connection restriction, the radio terminals 190-1 and 190-3 among the three radio terminals are communicating with the base station 115 in another cell and the radio terminal 190-2 is not communicating.

An explanation will be started from a situation where the radio terminal 190-1 is connected to the base station in another cell and the radio terminals 190-2 and 190-3 are not communicating by a process for stopping the call control function in FIG. 3. The maintenance person operates the operation & maintenance controller 230 and makes a start-up instruction to the base station controller 120 (step 401).

The base station controller 120 which received the start-up instruction executes an initial setting process and prepares to start the communication (step 402). Further, the controller 120 activates the hand-off restriction function and transmits the hand-off instruction message to the radio terminals 190-1, 190-2, and 190-3 (steps 403, 404). In this manner, the hand-off is preferentially restarted, the hand-off permission value is set to 100%, and the radio terminal 190-1 connected to the base station in another cell in step 309 is reconnected to the base station 110. After that, the new connection is also restarted and the new connection permission value is raised from 0% to a target value. In this instance, target values of both the hand-off permission value and the new connection permission value are set to 100%.

For example, as shown in FIG. 13, if the hand-off permission value is set to 100% (after canceling the connection restriction), the radio terminal 190-1 connected to the base station in another cell detects that the base station 110 has started the call process service, and tries to change the base station in another cell to which the radio terminal 190-1 has been connected to the base station 110. The base station which is requested to change the connection permits to accept the connection at a probability of 100% and the communication between the radio terminal 190-1 and the base station 110 is started. When the hand-off permission value is set to 100% (after canceling the connection restriction), if the radio terminal 190-3 existing at the location where the cell of the base station 110 and the cell of a base station 115 overlap as shown in FIG. 13 intends to perform the hand-off to the base station 110, the hand-off is certainly permitted.

Subsequently, the new connection restriction function is validated and the timer for the new connection is activated (step 405). After step 405, the base station controller 120 broadcasts three times the "new connection restriction message" including the new connection permission value to the radio terminals 190-1, 190-2, and 190-3 existing in its own cell. It is assumed that before such a message is transmitted, the new connection permission value has been set to 0%. The first "new connection restriction message" 2-1 includes an instruction to set the new connection permission value to 20%. The second "new connection restriction message" 2-2 includes an instruction to set the new connection permission value to 60%. The third "new connection restriction message" 2-3 includes an instruction to set the new connection permission value to 100%. Although the "new connection restriction message" is transmitted three times here, the number of transmitting times is not limited to three but may be set to an arbitrary number. It can be also arbitrarily set how much percent to decrease the new connection permission value each transmission of the "new connection restriction messages".

The base station controller 120 transmits the "new connection restriction message" 2-1 to the radio terminals 190-1, 190-2, and 190-3 (step 406). The radio terminals 190-1, 190-2, and 190-3 which received the "new connection restriction message" 2-1 increases the access frequency at which the radio terminal requests the new connection to the base station 110 to up to 20%. The "new connection restriction message" is broadcasted to all radio terminals in the cell irrespective of whether or not the radio terminal is communicating.

Subsequently, the base station controller 120 transmits the "new connection restriction message" 2-2 to the radio terminals 190-1, 190-2, and 190-3 (step 407). The radio terminals 190-1, 190-2, and 190-3 which received the "new connection restriction message" 2-2 increases the access frequency at which the radio terminal requests the new connection to the base station 110 to up to 60%. Subsequently, the base station controller 120 transmits the "new connection restriction message" 2-3 to the radio terminals 190-1, 190-2, and 190-3 (step 408). The radio terminals 190-1, 190-2, and 190-3 which received the "new connection restriction message" 2-3 increases the access frequency at which the radio terminal requests the new connection to the base station 110 to up to 100%.

Although the "new connection restriction message" is transmitted three times here, the number of transmitting times is not limited to three but may be set to an arbitrary number. However, according to the method for, gradually with time, increasing the new connection permission value more than once, the occurrence of the lack of resources in the base station 110 due to radio terminals which intend to newly connect can be prevented, and the quality of a radio communication environment can be improved as compared with that in the case of suddenly increasing the new connection permission value.

After that, the base station controller 120 starts such an ordinary operation that the new connection permission value is set to 100% (step 409). When the new connection permission value is set to 100% (after canceling the connection restriction), if the radio terminal 190-2 existing in the cell of the base station 110 as shown in FIG. 13 intends to newly connect to the base station 110, it is certainly permitted.

As mentioned above, the radio terminal 190-1 which received the redirect instruction when the call control service of the base station 110 had temporarily been stopped and was connected to another base station 115 receives the hand-off instruction at the time of the restart of the call control service of the base station 110 and thus is reconnected to the base station 110.

The base station controller 120 preferentially executed such a process and thereafter, starts a process for permitting the new connection of the radio terminal 190-2 which was not connected to the base station 110 before the temporary stop of the call control service. Therefore, since the number of radio terminals which are connected to the base station 110 increases step by step in order of (1) the radio terminal which has changed the base station 110 to which the radio terminal was connected to another base station 115 and (2) the radio terminal which newly requested the connection, the access concentration of the call control service can be relieved. This is because the radio terminal connected to the base station 110 before the stop of the call control is allowed to preferentially use software updated while the call control of the base station has been stopped. No problem will occur even in the construction in which the radio terminal which newly requested the connection is allowed to preferentially use it, and it is important that the number of radio terminals which are connected to the base station 110 is increased step by step.

Although the hand-off instruction message is transmitted in step 404 in FIG. 4, the base station 110 or the base station controller 120 may hold the hand-off permission value without transmitting such a message. Even if the radio terminal does not receive the message, it can detect that the operation of the base station 110 has been restarted (radio wave has been recovered) and can spontaneously send a request to the base station controller 120 in order to notify that it wants to perform the hand-off to the base station 110.

In FIGS. 3 and 4, the sequences for the stop of the call process function of the base station controller 120 and the restart of the call process function thereof have been described. Sequences for the stop of the call process function of the base station 110 and the restart of the call process function thereof will now be described with reference to FIGS. 5 and 6.

Figure 5:
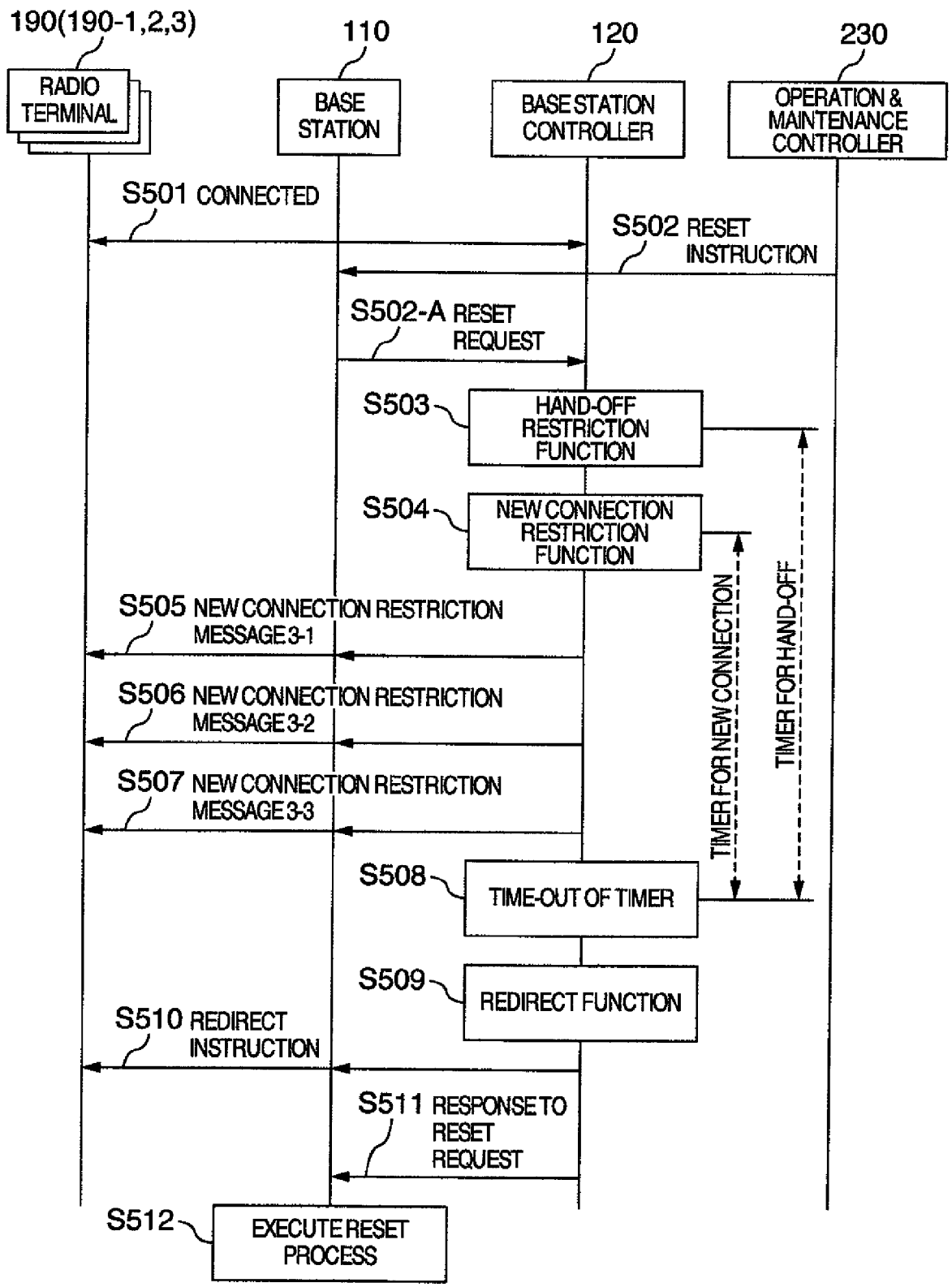
FIG. 5 is a sequence diagram when a base station is reset (when the call control function is stopped)

FIG. 5 is a sequence when the base station 110 is reset (when the call control function is stopped). An explanation is started from a situation where the radio terminal 190-1 and the base station controller 120 are connected and are communicating therebetween (step 501). The maintenance person operates the operating unit of the operation & maintenance controller 230 and makes a reset instruction to the base station 110 (step 502).

The base station 110 which received the reset instruction makes a reset request to the base station controller 120 (step 502-A). The base station controller 120 which received the reset instruction from the base station 110 makes the hand-off restriction function operative and activates the timer for the hand-off (step 503). The controller 120 also makes the new connection restriction function operative and activates the timer for the new connection (step 504).

After that, since the steps where the base station controller 120 transmits "new connection restriction messages" 3-1, 3-2, and 3-3 to the radio terminal 190 (steps 505 to 507) and the steps where the base station controller 120 makes the redirect function (Redirect function) operative after the periods set in the timer for the new connection and the timer for the hand-off expired (steps 508 and 509) are similar to steps 305 to 309 in FIG. 3, their description is omitted.

After the base station controller 120 transmitted the redirect instruction to the radio terminal 190 in step 508 (step 510), the controller 120 transmits a response to the reset request to the base station 110 (step 511). When the base station 110 receives the response, it executes the resetting process and completely stops the call process (step 512). Although the reset instruction has first been issued directly to the base station 110 in order to execute the resetting process of the base station 110 (step 502-A) in FIG. 5, even if the reset instruction reaches the base station 110 via the base station controller 120, no problem will occur. In this case, when the reset instruction is transmitted to the base station controller 120 in step 302 in FIG. 3, the reset instruction may include such an instruction as to allow the base station 110 to execute the resetting process, and the base station controller 120 may issue the reset instruction to the base station 110 after step 311 to allow the base station 110 to execute the resetting process.

Figure 6:
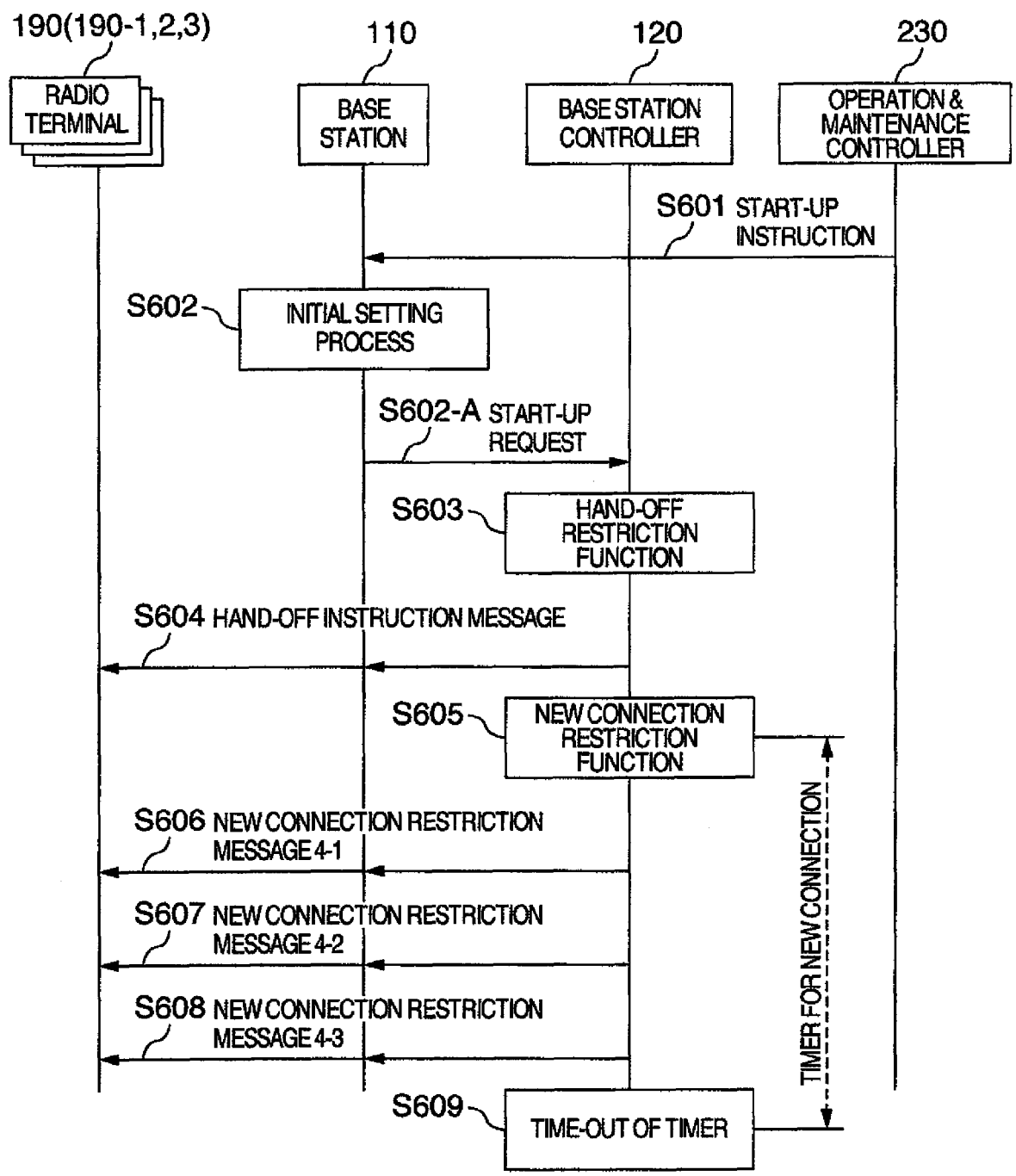
FIG. 6 is a sequence diagram when the base station is started up (when the call control function is restarted)

FIG. 6 is a sequence when the base station 110 is started up (when the call control function is restarted). An explanation is started from a situation where the connection between the radio terminal 190 and the base station controller 120 has been disconnected by a process for stopping the call control function in FIG. 5. The maintenance person operates the operating unit 232 of the operation & maintenance controller 230 and makes a start-up instruction to the base station 110 (step 601). The base station 110 which received the instruction executes the initial setting process (step 602) and makes a start-up request to the base station controller 120 (step 602-A).

The base station controller 120 which received the above request executes the initial setting process and prepares to start the communication. Further, the controller 120 activates the hand-off restriction function and transmits the hand-off instruction message to the radio terminals 190-1, 190-2, and 190-3 (steps 603 and 604). The controller 120 also activates the new connection restriction function and makes the timer for the new connection operative (step 605). After that, since the steps where the base station controller 120 transmits "new connection restriction messages" 4-1, 4-2, and 4-3 to the radio terminal 190 (steps 606 to 608) are similar to steps 406 to 408 in FIG. 4, their description is omitted. After that, the base station 110 and the base station controller 120 start the ordinary operation in which the new connection permission value is set to 100% (step 609).

Although the start-up instruction has first been issued directly to the base station 110 in order to execute the initial setting process of the base station 110 in FIG. 6 (step 601), even if the start-up instruction reaches the base station 110 via the base station controller 120, no problem will occur. In this case, when the start-up instruction is transmitted to the base station controller 120 in step 401 in FIG. 4, the start-up instruction may include such an instruction as to allow the base station 110 to execute the process.

Figure 7:
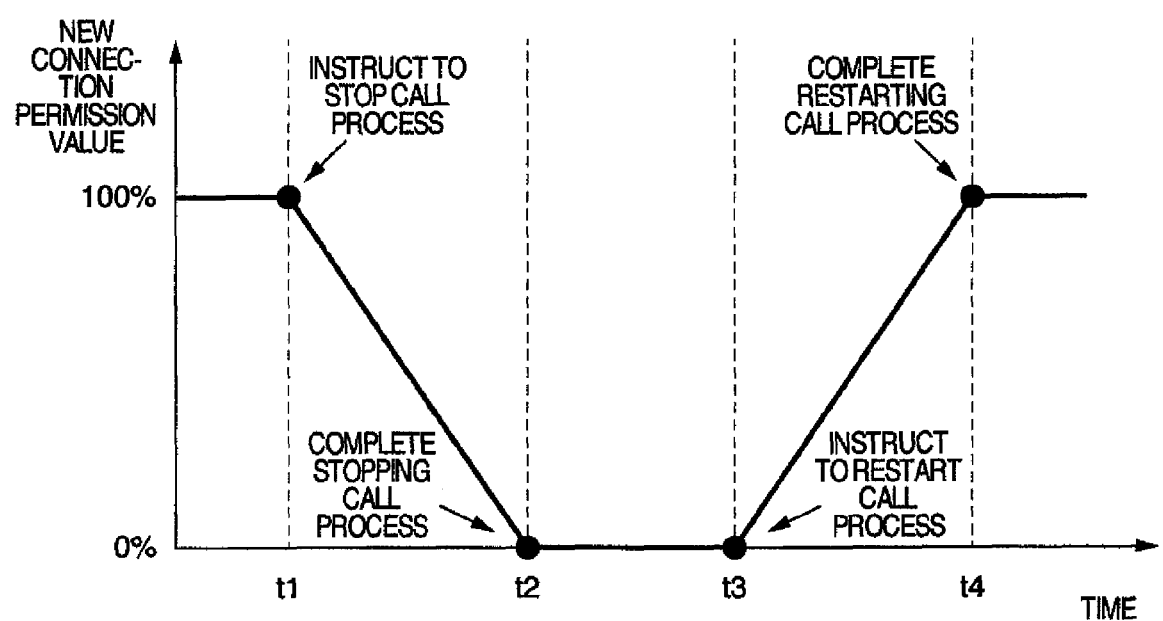
FIG. 7 shows a time-dependent change of a new connection restriction of the base station.

FIG. 7 shows a time-dependent change of a connection restriction in the case where, after a call process service of the base station controller 120 has been stopped, it is restarted. A horizontal scale indicates a time and a vertical scale indicates a change in the new connection permission value of the base station controller. The base station controller 120 is operated based on the new connection permission value (for example, 100%) which has initially been designated by the maintenance person. After that, when the maintenance person issues such an instruction as to stop the call process service at time t1, the base station controller 120 broadcasts the "new connection restriction message". At time t2 when the period of time set by the timer for the new connection elapses from time t1, the redirect instruction is transmitted and the stop of the call process service is completed. At this time, the new connection permission value is 0%.

After that, the maintenance operation is finished and the base station controller 120 broadcasts the "new connection restriction message" from time t3 and restarts the call process service. At time t4 when the period of time set by the timer for the new connection elapses from time t3, the connection permission value is returned to 100% and the restart of the call process service is completed. At this time, the new connection permission value is 100%.

Figure 8:
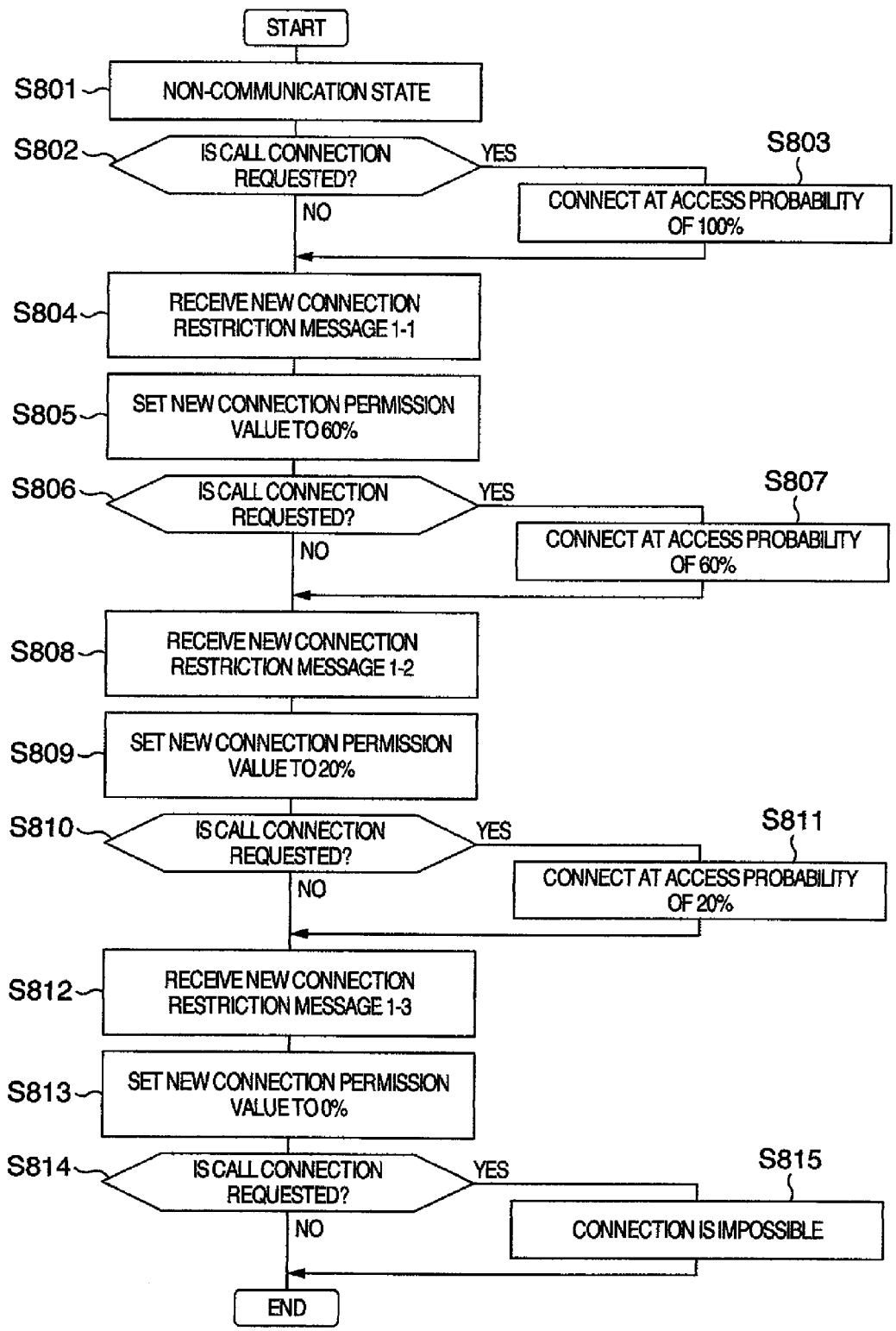
FIG. 8 is a flowchart (1) showing the operation of the radio terminal which received a new connection permission value.

FIG. 8 shows a flowchart for the radio terminal 190-2 which was not communicating in FIG. 3. It is assumed that a control unit 191-2 of the radio terminal 190-2 is in the non-communication state at the beginning (step 801). The information showing that the new connection permission value is 100% has been stored in a memory unit 193-2 of the radio terminal 190-2 at the beginning. On the basis of it, access probability is set to 100%. Therefore, if the user requests a call connection, the connection to the base station 110 is tried at the access probability of 100%, that is, it is certainly tried (steps 802 and 803). If the user does not request a call connection, the radio terminal waits to receive the "new connection restriction message" 1-1.

When the control unit 191-2 of the radio terminal 190-2 receives the "new connection restriction message" 1-1, it stores the information showing that the new connection permission value is 60% into the memory unit 193-2 (steps 804 and 805). Whether or not the user requests a call connection is determined here (step 806). If the user requests a call connection, the connection to the base station 110 is tried at the access probability of 60% by a communication unit 194-2 (step 807). If the user does not request a call connection, the radio terminal waits to receive the "new connection restriction message" 1-2.

When the control unit 191-2 of the radio terminal 190-2 receives the "new connection restriction message" 1-2, it stores the information showing that the new connection permission value is 20% into the memory unit 193-2 (steps 808 and 809). Whether or not the user requests a call connection is determined here (step 810). If the user requests a call connection, the connection to the base station 110 is tried at the access probability of 20% by the communication unit 194-2

(step 811). If the user does not request a call connection, the radio terminal waits to receive the "new connection restriction message" 1-3.

When the control unit 191-2 of the radio terminal 190-2 receives the "new connection restriction message" 1-3, it stores the information showing that the new connection permission value is 0% into the memory unit 193-2 (steps 812 and 813). Whether or not the user requests a call connection is determined here (step 814). Even if the user requests a call connection, since the access probability is 0%, the radio terminal cannot issue the message for requesting the call connection even if it wants to issue such a message, so that the call connection does not occur (step 815).

Figure 9:
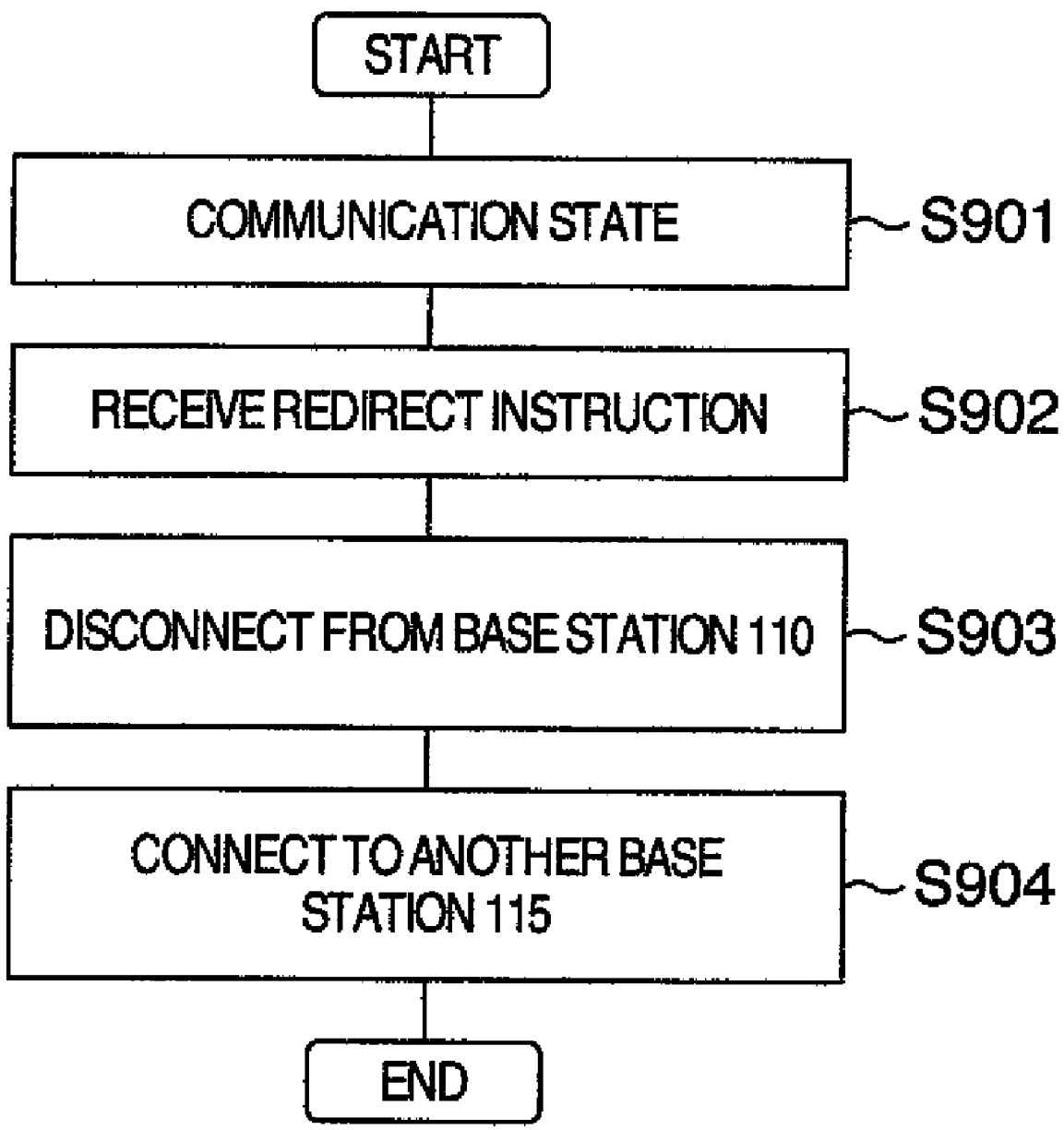
FIG. 9 is a flowchart (1) showing the operation of the radio terminal which received a redirect instruction.

FIG. 9 shows a flowchart for the radio terminal 190-1 in FIG. 3. It is assumed that a control unit 191-1 of the radio terminal 190-1 is in the communication state at the beginning (step 901). When the base station controller 120 makes the new connecting function operative, the radio terminal 190-1 receives the "new connection restriction messages" 1-1 to 1-3 in a manner similar to the radio terminal 190-2. However, in this flowchart, such a step is omitted and an explanation will be made. When the control unit 191-1 of the radio terminal 190-1 receives the redirect instruction, it disconnects the connection to the base station 110 which is at present connected (steps 902 and 903). The control unit 191-1 tries to connect to another base station and can continue the communication without interrupting the communication (step 904).

Figure 10:
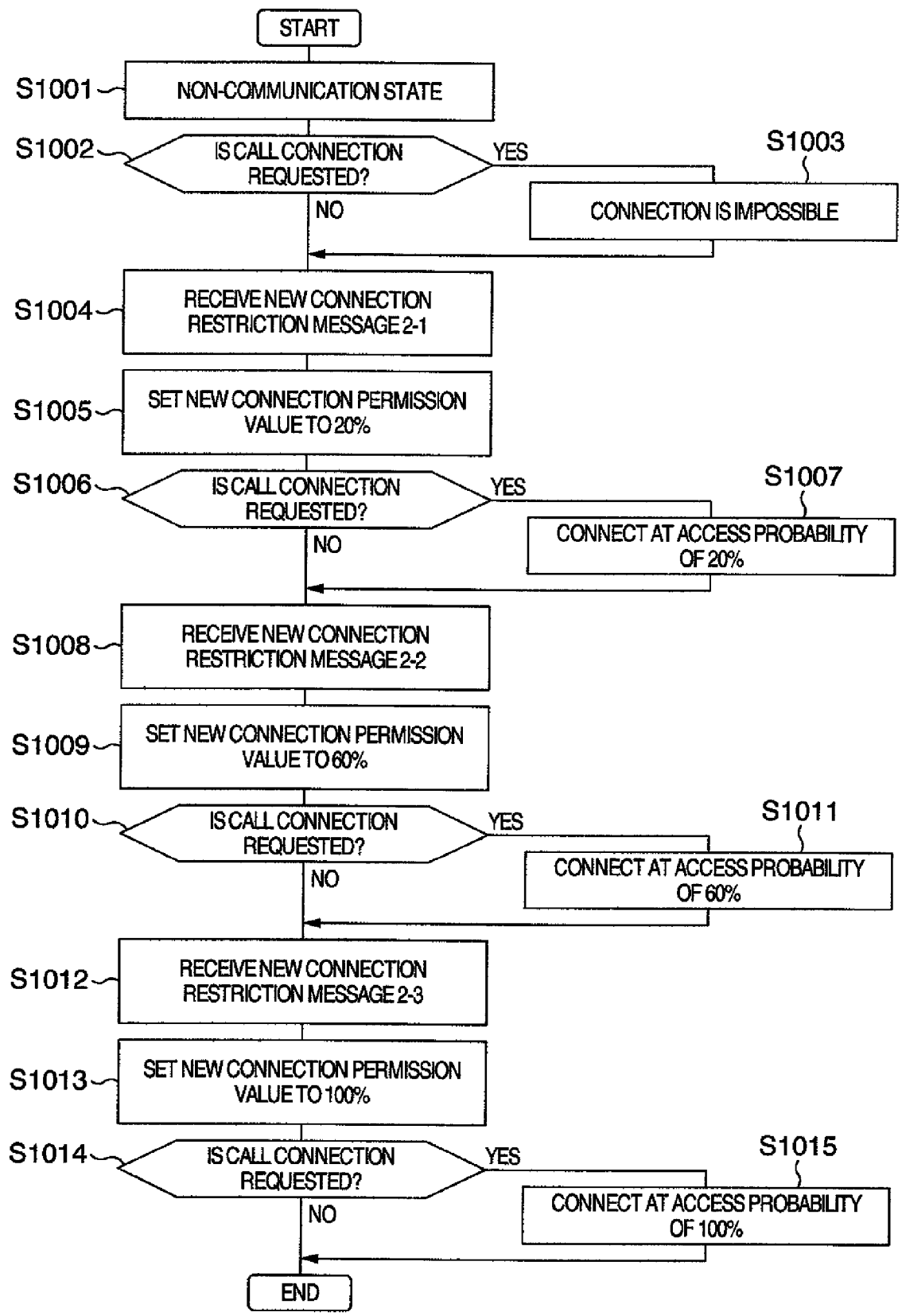
FIG. 10 is a flowchart (2) showing the operation of the radio terminal which received the new connection permission value.

FIG. 10 shows a flowchart for the radio terminal 190-2 in FIG. 4. This flowchart is similar to one for the radio terminal 190-3.

It is assumed that the control unit 191-2 of the radio terminal 190-2 is in the non-communication state at the beginning (step 1001). The information showing that the new connection permission value is 0% has been stored in the memory unit 193-2 of the radio terminal 190-2 at the beginning. On the basis of it, the access probability is set to 0% (the connection is impossible). Therefore, even if the user requests a call connection, the connection is not tried (steps 1002, 1003). If the user does not request a call connection, the radio terminal waits to receive the "new connection restriction message" 2-1.

When the control unit 191-2 of the radio terminal 190-2 receives the "new connection restriction message" 2-1, it stores the information showing that the new connection permission value is 20% into the memory unit 193-2 (steps 1004 and 1005). Whether or not the user requests a call connection is determined here (step 1006). If the user requests a call connection, the connection to the base station 110 is tried at the access probability of 20% by the communication unit 194-2 (step 1007). If the user does not request a call connection, the radio terminal waits to receive the "new connection restriction message" 2-2.

When the control unit 191-2 of the radio terminal 190-2 receives the "new connection restriction message" 2-2, it stores the information showing that the new connection permission value is 60% into the memory unit 193-2 (steps 1008 and 1009). Whether or not the user requests a call connection is determined here (step 1010). If the user requests a call connection, the connection to the base station 110 is tried at the access probability of 60% by the communication unit 194-2 (step 1011). If the user does not request a call connection, the radio terminal waits to receive the "new connection restriction message" 2-3.

When the control unit 191-2 of the radio terminal 190-2 receives the "new connection restriction message" 2-3, it stores the information showing that the new connection permission value is 100% into the memory unit 193-2 (steps 1012 and 1013). Whether or not the user requests a call connection is determined here (step 1014). If the user requests a call connection, the connection to the base station 110 is tried at the access probability of 100%, that is, it is certainly tried (step 1015).

Figure 11:
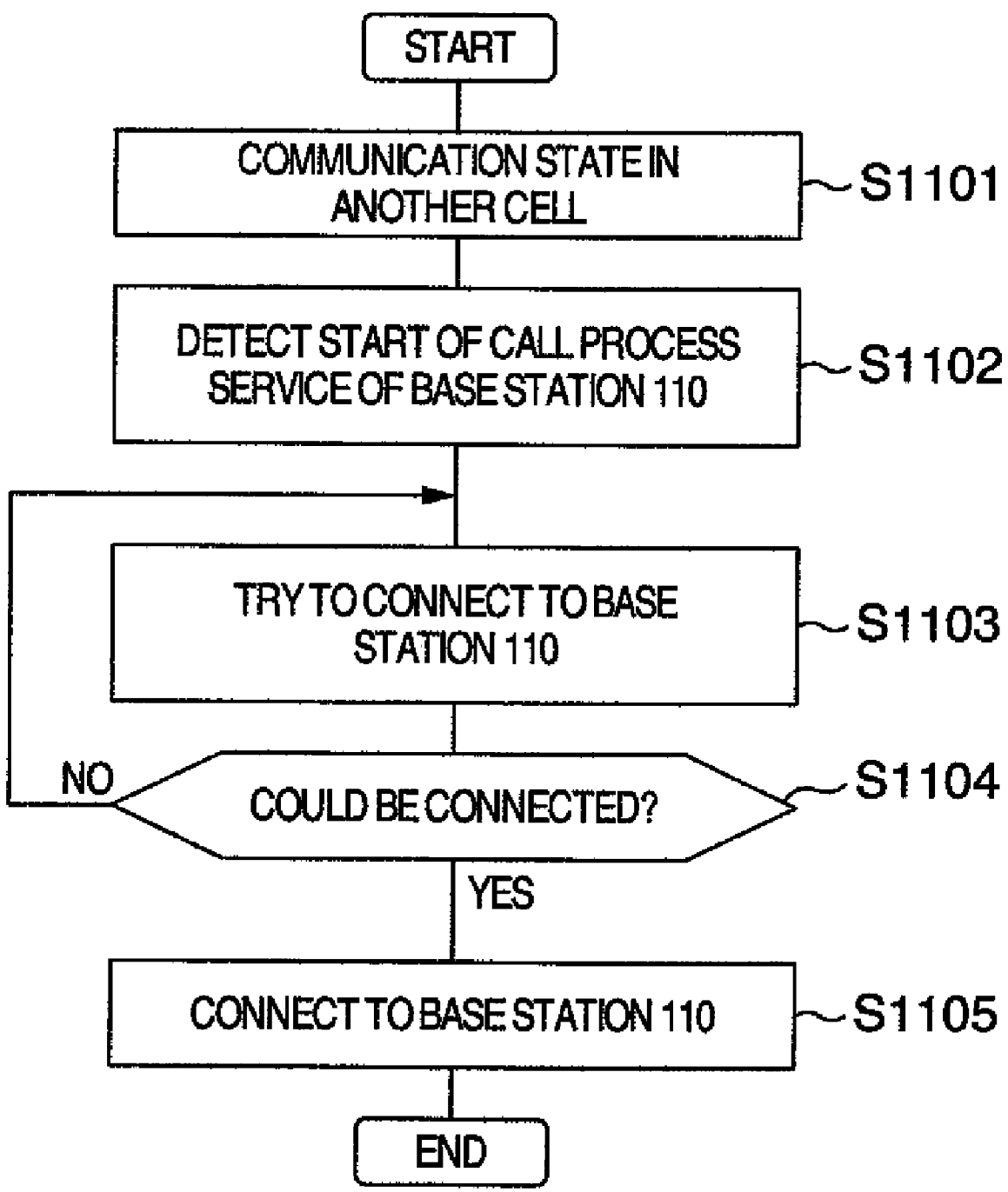
FIG. 11 is a flowchart (2) showing the operation of the radio terminal which received the redirect instruction.

FIG. 11 shows a flowchart for the radio terminal 190-1 which has been connected to the base station of another cell by the redirect instruction in communication in FIG. 4. It is assumed that the control unit 191-1 of the radio terminal 190-1 is in the communication state at the beginning (step 1101). When the base station controller 120 makes the new connecting function operative, the radio terminal 190-1 receives the "new connection restriction messages" 2-1 to 2-3 in a manner similar to the radio terminal 190-2 (190-3). However, in this flowchart, such a step is omitted and an explanation will be made.

When the control unit 191-1 of the radio terminal 190-1 detects that the call process service of the base station 110 of its own cell has been restarted, it tries to connect to the base station 110 (steps 1102 and 1103). If it could do, the control unit 191-1 disconnects the connection to the base station of another cell which is connected at present and continues the connection to the base station 110 of its own cell (steps 1104 and 1105).

As mentioned above, according to the embodiment, when the call control function of the base station is temporarily stopped and then restarted, the access concentration from the radio terminals can be avoided. Although the explanation has been made so far on the assumption that the base station and the base station controller are the different apparatuses, those two apparatuses may be collectively called a base station. That is, it can be said that the base station has the new connection restriction function, the hand-off restriction function, and the redirect function. In the embodiment, even if the base station does not have all of the three functions such as new connection restriction function, hand-off restriction function, and redirect function, a predetermined effect of the avoidance of the access concentration can be provided even by one or two of those functions.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A base station controller configured to control the operation of call control of base stations, the call control permitting or denying a connection in response to a connecting request from a radio terminal, the base station controller comprising:
   a receiving unit configured to receive instructions, wherein said instructions include at least one of a stop instruction to stop the call control of a base station; and a restart instruction to restart the call control of a base station; and
   a control unit configured:
      to stop the call control of a first base station, and to change a base station of a radio terminal from said first base station to a second base station different from said first base station, after said receiving unit receives a stop instruction to stop the call control of the base station, wherein a process for stopping the call control includes a process for not permitting a hand-off of the radio terminal to the first base station, and
      to change the base station of the radio terminal from said second base station to said first base station, and thereafter permit a new connection between another radio terminal and said first base station, after said receiving unit receives a restart instruction to restart the call control of the base station.

2. A controller according to claim 1, wherein said control unit increases, gradually with time, the number of radio terminals which are permitted to be newly connected to said first base station, and thereby permits the new connection of another radio terminal to said first base station.

3. A controller according to claim 1, wherein a process for stopping said call control includes a process for setting to zero the number of radio terminals which are permitted to be newly connected said to said first base station, thereby not permitted any new radio terminal to be connected.

4. A base station controller configured to control the operation of call control of a base station, the call control permitting a connection to a radio terminal in response to a connecting request, the base station controller comprising:
a receiving unit configured to receive instructions, wherein said instructions include at least one of a stop instruction to stop the call control of a base station, and a restart instruction to restart the call control of a base station;
a connection restriction unit configured to set a connection permission value specifying the number of radio terminals which are permitted to be newly connected to said base station; and
a control unit configured:
to set the connection permission value to be smaller than a value preset by said connection restriction unit, transmit the smaller connection permission value to said radio terminal, and thereafter stop the call control, after said receiving unit receives a stop instruction to stop the call control of said base station, wherein a process for stopping the call control includes a process for not permitting a hand-off of the radio terminal to the first base station, and
to set the connection permission value to be larger than the value transmitted by said connection restriction unit at the time of stopping the call control of said base station, and transmit the larger connection permission value to said radio terminal, after said receiving unit receives a restart instruction to restart the call control of said base station 5. A controller according to claim 4, wherein before stopping the call control of said base station, said control unit transmits to said radio terminal the connection permission value set to zero by said connection restriction unit, thereby not allowing any connection.

6. A controller according to claim 4, further comprising:
a hand-off restriction unit configured to set a hand-off permission value specifying a hand-off success ratio of the radio terminal which performs a hand-off to said base station, wherein before stopping the call control of said base station, said control unit sets the hand-off permission value to be smaller than the number preset by said hand-off restriction unit and transmits the smaller hand-off permission value to said radio terminal.

7. A controller according to claim 4, wherein when said receiving unit receives a restart instruction to restart the call control of the base station, said control unit increases, gradually with time, the number of radio terminals which are permitted to be connected to said base station.

8. A method for restricting access by controlling the operation of call control of a base station, the call control permitting a connection in response to a connecting request from a radio terminal, the method for restricting access comprising the steps of:
setting a connection permission value specifying the number of radio terminals which are permitted to be newly connected to said base station;
after receiving a stop instruction to stop the call control of said base station, setting said connection permission value to be smaller than a preset value and transmitting the smaller connection permission value to said radio terminal, and thereafter, stopping the call control, wherein stopping the call control includes not permitting a hand-off of the radio terminal to the first base station; and
after receiving a restart instruction to restart the stopped call control of said base station, setting said connection permission value to be larger than the value transmitted at the time of stopping the call control of said base station and transmitting the larger connection permission value to said radio terminal.

9. A method according to claim 8, further comprising:
after receiving the stop instruction to stop the call control of said base station, setting said connection permission value to zero and transmitting said connection permission value to said radio terminal, thereby not allowing any connection.

10. A base station controller according to claim 1, wherein a stop instruction to stop the call control of a base station is issued in order to enable maintenance to be performed on said base station.

11. A base station controller according to claim 10, wherein said maintenance includes software updating by an instruction.

12. A base station controller according to claim 4, wherein a stop instruction to stop the call control of a base station is issued in order to enable maintenance to be performed on said base station.

13. A base station controller according to claim 12, wherein said maintenance includes software updating by an instruction.

14. A method for restricting access according to claim 8, wherein a stop instruction to stop the call control of a base station is issued in order to enable maintenance to be performed on said base station.

15. A method for restricting access according to claim 14, wherein said maintenance includes software updating by an instruction.

* * * * *